United States Patent
Bovyrin et al.

(10) Patent No.: US 10,180,782 B2
(45) Date of Patent: Jan. 15, 2019

(54) FAST IMAGE OBJECT DETECTOR

(71) Applicant: Intel Corporation, Santa Clara, CA (US)

(72) Inventors: Alexander Bovyrin, Nizhy Novgorod (RU); Vadim Pisarevsky, Nizhy Novgorod (RU); Irina Kostina, Nizhy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/242,886

(22) Filed: Aug. 22, 2016

(65) Prior Publication Data

US 2017/0053193 A1 Feb. 23, 2017

Related U.S. Application Data

(60) Provisional application No. 62/207,642, filed on Aug. 20, 2015.

(51) Int. Cl.
*G06K 9/00* (2006.01)
*G06F 3/0484* (2013.01)
(Continued)

(52) U.S. Cl.
CPC ........ *G06F 3/04847* (2013.01); *G06F 3/0482* (2013.01); *G06K 9/00* (2013.01); *G06K 9/6257* (2013.01)

(58) Field of Classification Search
CPC .......................... G06F 3/0482; G06F 3/04847
See application file for complete search history.

(56) References Cited

U.S. PATENT DOCUMENTS

2009/0304290 A1* 12/2009 Fukaya .............. G06K 9/00228
382/224
2011/0255743 A1* 10/2011 Guan ................. G06K 9/00818
382/103

(Continued)

OTHER PUBLICATIONS

Viola, P., et al., "Robust Real-Time Object Detection," Compaq, Cambridge Research Laboratory, Technical Report Series, Feb. 2001 (30 pages).

(Continued)

*Primary Examiner* — ONeal R Mistry
(74) *Attorney, Agent, or Firm* — Trop, Pruner & Hu, P.C.

(57) ABSTRACT

A specified object in still images or video may be detected using a sliding search window technique, applied to the original image and its downscaled versions, in order to detect objects of different sizes. At each scale and each position of the sliding window, the technique may use a boosted tree classifier to determine whether the window contains the object. It may exit earlier if some intermediate sum falls below the certain threshold. To accelerate object detection, hybrid features are used in different boosted chains. For first boosted chains, the fastest features may be applied and then, after more complex (but slower) features and for the last few chains, the most powerful feature (but most computationally expensive) is used. This strategy may improve the speed of detection because for a majority of checking windows, only first boosted chains are used and so only the fastest features are calculated in some embodiments.

30 Claims, 5 Drawing Sheets

(51) Int. Cl.
*G06F 3/0482* (2013.01)
*G06K 9/62* (2006.01)

(56) References Cited

U.S. PATENT DOCUMENTS

| | | | | |
|---|---|---|---|---|
| 2012/0089545 A1* | 4/2012 | Mei | ............... | G06K 9/6257 706/20 |
| 2012/0134579 A1* | 5/2012 | Kameyama | ............ | G06T 3/4053 382/159 |
| 2012/0263346 A1* | 10/2012 | Datta | ............ | G06K 9/00751 382/103 |
| 2013/0272575 A1* | 10/2013 | Li | ............ | G06K 9/4671 382/103 |
| 2015/0049942 A1* | 2/2015 | Hamsici | ............ | G06K 9/4609 382/170 |

OTHER PUBLICATIONS

Open-source implementation of object detection algorithm, a variation of [1], retrieved from Internet on Nov. 2, 2016 at http://docs.opencv.org/2.4/modules/ocl/doc/object_detection.html (3 pages).

Xiao, R., et al., "Boosting chain learning for object detection," Computer Vision, 2003, Proceedings 9th IEEE International Conference on Computer Vision, IEEE, 2003 (7 pages).

Friedman, J., et al., "Additive logistic regression: a statistical view of boosting," Technical Report, 1998 (71 pages).

Bourdev, L., et al., "Robust object detection via soft cascade," In Proc. of CVPR, 2005 (8 pages).

\* cited by examiner

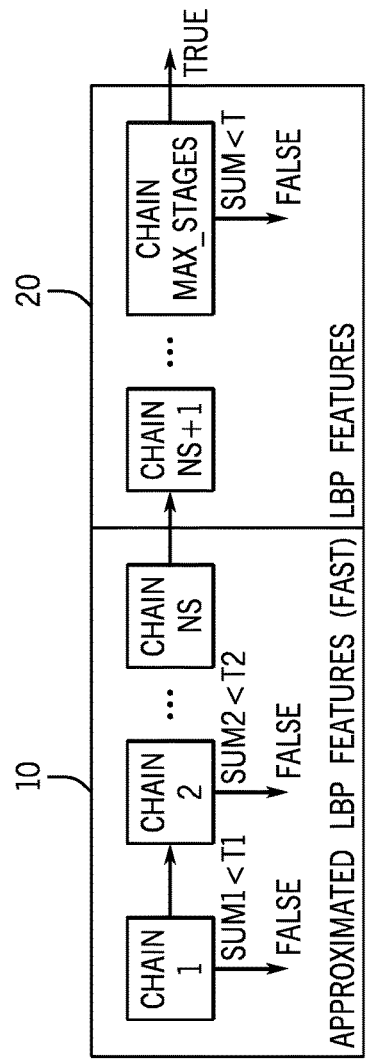
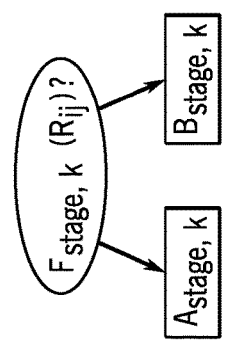
FIG. 1
FIG. 2

FAST IMAGE OBJECT DETECTOR

CROSS-REFERENCE TO RELATED APPLICATION

This is a non-provisional application claiming priority to provisional application 62/207,642 filed Aug. 20, 2015.

BACKGROUND

This relates to computer recognition of objects in video or still pictures, including the recognition of traffic signs.

Object detection is very popular building block of many computer vision applications such as face detection, pedestrian detection, and sign detection. Object detection is used in video surveillance systems, which find and recognize people's faces, digital signage systems, advanced driver assistance systems and others. Such tasks often need to run in real-time, often on low-power mobile or embedded devices, and so the object detection, as one of the simplest blocks, needs to run very fast.

BRIEF DESCRIPTION OF THE DRAWINGS

Some embodiments are described with respect to the following figures:

FIG. 1 schematically depicts a boosted chain cascade with hybrid features approach in some embodiments;

FIG. 2 is a depiction of a 1-node decision tree for one embodiment;

DETAILED DESCRIPTION

Figure 3:
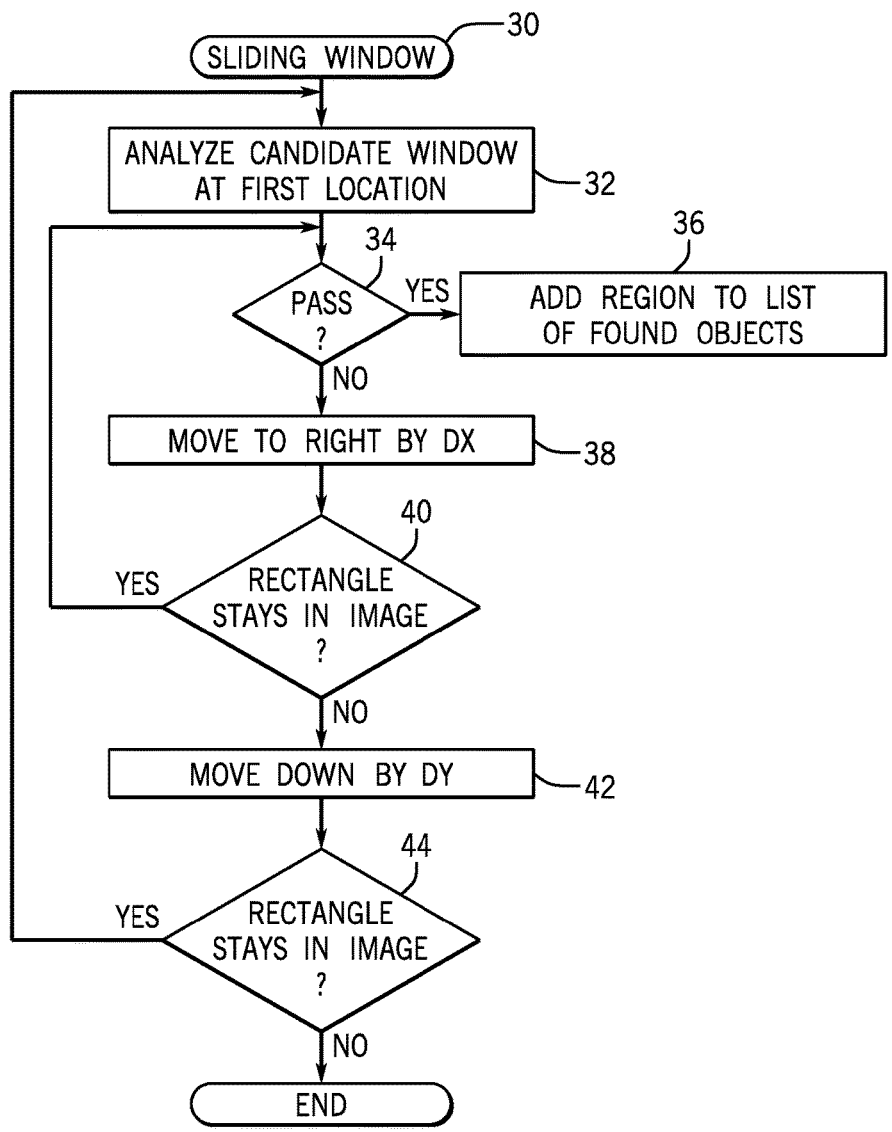
FIG. 3 is a sliding window flow chart for one embodiment.

A specified object in still images or video may be detected using a sliding search window technique, applied to the original image and its downscaled versions, in order to detect objects of different sizes. At each scale and each position of a sliding window, the technique uses a boosted tree classifier to determine whether the window contains the object. The boosted tree classifier, which is a sum of weak classifiers, is computed by parts (boosted chains). It may exit earlier (i.e. counts window as a non-object) if some intermediate sum falls below the certain threshold.

To accelerate object detection, hybrid features are used in different boosted chains. For first boosted chains, the fastest features may be applied and then, after more complex (but slower) features and for the last few chains, the most powerful feature (but most computationally expensive) is used. This strategy may improve the speed of detection because, for a majority of checking windows, only first boosted chains are used and so only the fastest features are calculated in some embodiments. Using boosted chain technology and hybrid features strategy, the detector is significantly more efficient in some embodiments.

A classical sliding window approach finds an object of particular fixed size (say, 20×20 pixels) within an image. The size is a parameter of the training procedure and is then a constant for each trained classifier. To detect larger objects in the same image, the algorithm scales the image down and then repeats the sliding window procedure.

The procedure involves execution of a classifier at each window position. The classifier may be a boosting chain. It takes an image patch on input as a rectangular block of pixels and iteratively computes a response and a floating-point value, as a sum of up to several hundred weak classifier responses. All the weak classifiers are split into several groups, called stages. And so the sum is computed sequentially, stage by stage.

In the first Ns stages 10, shown in FIG. 1, very fast features may be used based on an approximated local binary pattern (LBP). In all of the rest of the stages 20, more computationally expensive features may be used for LBP features. Right after each intermediate sum is computed, it is compared to a certain value called a "stage threshold", ($T_{stddev}$), which value is determined during the training (as well as parameters of each weak classifier).

If the sum of weak classifier responds is below the stage threshold, the remaining stages are skipped and the window is considered as "an non object," indicated as "false" in FIG. 1. Otherwise, if the intermediate sums are all above the corresponding stage thresholds, the window is considered as a good object candidate and its position and size are stored together with the final sum of responses, which is treated as a candidate score. All such object candidates are collected from all the image layers.

Since each real object in a scene usually yields several object candidates near each other, the candidates for the same object are grouped, or more exactly, the weaker candidates are rejected in favor of better candidates using a non-maxima suppression procedure, which involves computing candidate scores. "Computing scores" means that, for each candidate region (window position within the image) the algorithm computes a numerical value that characterizes the probability of the object of interest being in this region, (e.g. the larger the value, the higher the probability). The list of remaining object candidates is the algorithm output.

In one embodiment, an algorithm, depicted in pseudo-code, may be implemented as follows:

a. Input: raster grayscale image, output: list of rectangles, containing "objects";

b. Set the initial scale=1, make the list of object candidates "FCL" empty;

c. Until the original image width is not less than $W_0$*scale and the original image height is not less than $H_0$*scale, where $W_0 \times H_0$ is the window size for the trained classifier and scale is any scaling factor used to increase or decrease the window size (see below), do:

c.1. Generate the current image layer by downscaling the original image by scale factor "scale". The integral image conventionally is a location x, y that contains the sum of the pixels above and to the left of x, y inclusive. Compute the integral of pixel values and the integral of squared pixel values. Both integrals may be stored as 32-bit integer arrays in some embodiments. In the case of overflow, only the lowest 32 bits may be stored.

c.2. For each pair of integers (i, j) so that the rectangle $R_{ij}$={left edge=x+j*dx, top edge=y+i*$d_y$, width=$W_0$, height=$H_0$} fits entirely in the current image layer, $d_x=d_y$={2 if scale <2, 1 otherwise}, run the boosted chain classifier:

$S_{ij}$:=0, where $S_{ij}$ is a candidate score at locator (j*$d_x$, i*$d_y$);

if standard_deviation($R_{ij}$)<$T_{stddev}$ then skip the rectangle, move to the next (i,j) pair;

while stage<number_of_stages do:
  while k<number_of_wc$_{stage}$ (where number_of_wc$_{stage}$ is the number of weak classifiers in the "stage". WeakClassifier$_{stage,k}$ is k-th weak classifier in the "stage"; correspondingly, k varies from 0 to number_of_wc$_{stage}$−1);
  $S_{ij}$:=$S_{ij}$+WeakClassifier$_{stage,k}$(Rij)
  if $S_{ij}$<$T_{stage}$; where $T_{stage}$ is the stage threshold, the value which the computed score $S_{ij}$ is compared to, then exit the loop;
  if the loop was interrupted, skip the rectangle; otherwise, store the scaled rectangle and its candidate score: FCL:=FCL∪($R_{ij}$*scale, $S_{ij}$), where R*scale means that the rectangle's top-left position and size are multiplied by "scale" to represent the object candidate in the original, unscaled, image coordinates and FCL stands for found candidates list.

The multi-scale detection algorithm in fact uses the same rectangle size $W_0 \times H_0$ for all possible object sizes. Instead of using a sliding window of size $W_0$*scale×$H_0$*scale, it downscales the image by the factor "scale." Correspondingly, if it finds a good candidate that passed the classifier, it scales the rectangle by "scale" to compute the real object size.

c.3. Increase the scale: scale:=scale*1.2 as one example;
d. Apply non-maxima suppression to the found candidates list (FCL)
  d.1. Sort FCLs in descending order by their candidate scores $S_i$
  d.2. For each ($R_i$, $S_i$), starting from the highest candidate score, do:
    For all ($R_j$, $S_j$) such that $S_j \leq S_i$ do
      if area($R_i \cap R_j$)/min(area($R_i$), area($R_j$))>0.65 then remove ($R_j$, $S_j$) from FCL.
e. Return the filtered FCL as the algorithm result.

The integral images are now explained for an image img(.) with pixel value at (x,y) denoted as img(x,y) whose integral image, Integral( ) is computed as:

Integral(X,Y)=$\Sigma_{x<X,y<Y}$img(x,y)

Correspondingly, the integral of squared pixel values is computed as:

SQIntegral(X,Y)=$\Sigma_{x<X,y<Y}$img(x,y)$^2$

As soon as the integral images are computed, one can compute a sum of pixels over a certain rectangle R:{left≤x<left+width, top≤y<top+height} with just three arithmetic operations: sum$_R$(img)=Integral(left, top)+Integral(left+width, top+height)−Integral(left+width, top)−Integral(left, top+height).

SQIntegral computes the sum of squared pixel values. These integrals are used to compute the standard deviation and also to compute each weak classifier.

The standard deviation over rectangle R is defined as:

StdDev(R)=$\sqrt{(sum_R(img^2)/n - sum_R(img)^2/n^2}$,

Where n=area(R) can be computed from Integral(.) and SQIntegral(.) using several arithmetic operations, regardless of the area of R. The threshold $T_{stddev}$ is computed over a large training set of images representing objects.

Each weak classifier WeakClassifier$_{stage,k}$($R_{ij}$) (wc$_{stage}$) may be a decision tree. For example this could be the simple 1-node decision tree shown in FIG. 2.

As an example, the weak classifier may be computed as follows. Within the rectangle $R_{ij}$, select a certain sub-rectangle, whose relative position and size are determined at a training stage. Both its width and height may be divisible by 3. The sub-rectangle is divided into 3×3 smaller sub-rectangles of equal size:

| $P_0$ | $P_1$ | $P_2$ |
| $P_7$ | $P_c$ | $P_3$ |
| $P_6$ | $P_5$ | $P_4$ |

Then compute the following 8-bit number:

value:=[sum$_{P0}$(img)>sum$_{Pc}$(img)]*$2^0$+
  [sum$_{P1}$(img)>sum$_{Pc}$(img)]*$2^1$+
  [sum$_{P7}$(img)>sum$_{Pc}$(img)]*$2^7$ where sum$_{P*}$(img) denotes the sum computed over the P* part of a sub-rectangle within $R_{ij}$. It is computed efficiently using the integral image and the operator [x] is defined as:

$$[x] = \begin{cases} 1 & \text{if } x \text{ is true} \\ 0 & \text{if } x \text{ is false} \end{cases}$$

Such values are called LBP features.

In the first Ns boosting chains, approximated LBP features are used instead of exact LBP features as described above. The approximated LBP features are calculated as follows:
1. Perform blurring of image img using a linear filter.
2. Do not calculate sum$_{P0}$(img), sum$_{P1}$(img), . . . , sum$_{P7}$(img). Instead of these sums, consider centers of P1, P2, . . . , P7 subregions and take the pixel value of blurred image in these centers. See SUM1 and SUM2 in FIG. 1.

Thus the approximated LBF feature has the value:=
[smoothed_img(pc$_0$)>smoothed_img(pc$_c$)]*$2^0$+
[smoothed_img(pc$_1$)>smoothed_img(pc$_c$)]*$2^1$+
[smoothed_img(pc$_7$)>smoothed_img(pc$_c$)]*$2^7$,
where smoothed_img is a blurred source image in corresponding scale, pc$_i$-center of Pi region, pc$_c$-center of central region Pc.

These approximated LBP features are calculated faster, compared with the classical LBP, and this approximation is not so critical for first boosting chains. Then a 256-bit lookup table (which is also computed at the training stage) may be used to determine whether $F_{stage,k}$(value) is true or false indicated whether the object appears to be present.

Then the weak classifier response is defined as:

$$WeakClassifier_{stage,k}(R_{ij}) = \begin{cases} A_{stage,k} & \text{if } F_{stage,k}(R_{ij}) \text{ is true} \\ B_{stage,k} & \text{if } F_{stage,k}(R_{ij}) \text{ is false} \end{cases}$$

The values of $A_{stage,k}$ and $B_{stage,k}$ are also defined at the training. A_stage, k and B_stage, K are the two leaf values of the weak classifier WeakClassifier_stage,k. That is, the weak classifier is a primitive decision tree, that outputs A_stage,k if the feature value satisfies certain condition and B_stage,k if it does not.

All the weak classifiers and the cumulative boosted chain classifier are trained as follows. Take several thousands ($N_0$) of positive images (representing cropped objects). All the positive images may have the same aspect ratio. Resize each positive image to the same size $W_0 \times H_0$. Take several thousands of high-resolution negative images of arbitrary size that do not contain an object to be detected. Select the initial set of $N_0$ negative and positive samples. Resize them all to $W_0 \times H_0$. Initialize a Gentle Adaboost training algorithm by making all the sample weights equal, and the initial set of WeakClassifiers is empty. (Gentle Adaboost is one of types of Adaboost algorithm, introduced by J. Friedman in "Jerome Friedman, Trevor Hastie, and Robert Tibshirani. Additive logistic regression: a statistical view of boosting. Technical Report, 1998).

For each stage from 0 to MAX_STAGES-1, do the following. If stage is greater than Ns, select a random pool of several thousands of LBP features, i.e. random sub-rectangles within $\{0 \leq x < W_0, 0 \leq y < H_0\}$ rectangle. For small enough $W_0$ and $H_0$, it is feasible to analyze all possible features. If stage is less than or equal to Ns, then select a random pool of several thousands of approximated LBP features.

Find the optimal 1-node regression tree for each feature that fits the current training set with the current weights for each training sample. See the website whose http address is docs.opencu.org/modules/ocl/doc/object_detection.html.

Among all of the regression trees, find the one (and the corresponding feature) that gives minimal intra-class standard deviation. Only the samples with large weights may be used, which summary weight is $N_{perc}$ (e.g. $N_{perc}$=95%) of the total sample weight. This technique is called weight trimming and it reduces the training time by an order of magnitude in some embodiments.

Add the computed weak classifier into the current stage. Update the sample weights as defined in the Gentle Adaboost algorithm.

Assuming that the stage is now complete, find a stage $T_{stage}$, so that the false alarm rate, $P_{FA}$, computed as the ratio of negative samples that pass the so-far constructed boost-chain classifier, is not greater than $T_{FA}$ (e.g. $T_{FA}$=0.5), and the hit-rate $P_{HR}$ (the ratio of positive samples that pass the so-far constructed boost-chain classifier) is not smaller than $T_{HR}$ (e.g. $T_{HR}$=0.995). $T_{FA}$ is high-level user-specified false alarm ratio for the overall object classifier. For example, if a user desires that no more than 0.0001% of randomly chosen rectangles not representing the object pass the classifier (i.e., 1-2 false alarms per image), then $T_{FA}$ should be set to 0.00001/100=0.0000001.

This may be done by sorting all the training samples by the response from boosted chain classifier and then iteratively trying to split the training set at different points. This can be done in O(N) time as long as the samples are sorted. O(N) denotes a "linear-time" theoretical complexity of an algorithm with respect to the number of training samples (N) it takes on input. In this particular case the algorithm has linear-time complexity with the assumption that scores (Sij) for all the training samples are computed and sorted. Computing the scores is done during the training and so the scores are always available. Sorting numerical values can be done in linear time using a radix sort algorithm. So the overall complexity is linear. If a $T_{stage}$ is found that satisfies both conditions, the stage is marked as complete, store $T_{stage}$ is stored and the flow moves to the next step.

If $T_{stage}$ is not found and number of weak classifiers in the current stage exceeded the maximal allowed number N_MAX for this stage, this means these negatives are too "hard" for this stage and other negatives should be sampled from training negative images, using a "bootstrapping" procedure described below. See SUM<T in FIG. 1.

Repeat steps until no negatives are found and $T_{stage}$, if found, satisfies $T_{FA}$ and $T_{HR}$ or maximal allowed number $N_{bs}$ of negative sampling (e.g. $N_{bs}$=5) is exceeded. In case $N_{bs}$ is exceeded, mark the stage as complete, store $T_{stage}$ and move to the next step described below.

Restriction of the maximal allowed number of weak classifiers in the stage and allowed multi-sampling of negatives explained above gives faster detection in some embodiments since fewer weak classifiers are obtained in each stage and stages are trained with more "suitable" negatives for this stage.

After the stage is complete, and if it is not the last stage, then use bootstrapping to add some "hard negatives", i.e. negative samples that the so-far trained boosted chain classifier cannot classify properly. That is, run the multi-scale object detector on a certain number of high-resolution negative images and select the rectangles that got the highest positive scores, $N_0$*0.25 at maximum. Adjust the weights of the negative samples so that the total weight of negative samples stays the same after bootstrapping.

Figure 4:
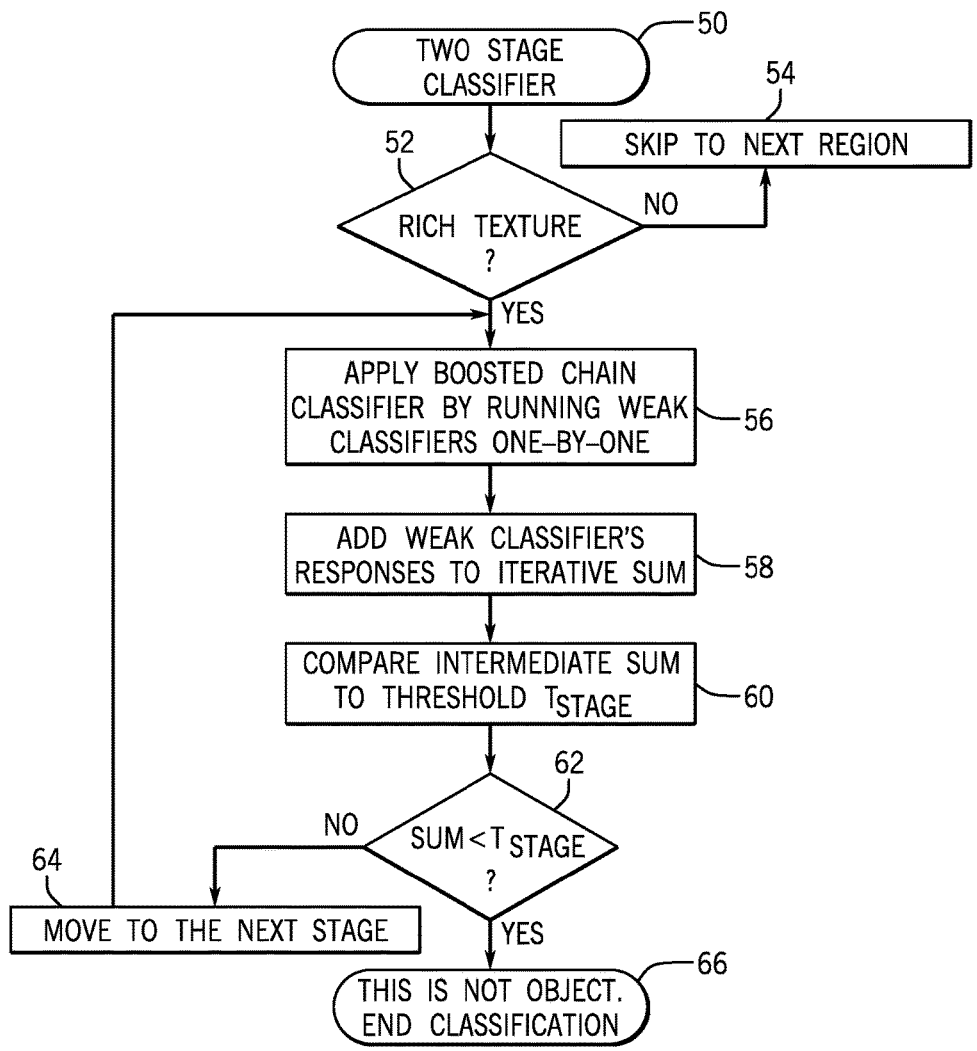
FIG. 4 is a two stage classifier flow chart for one embodiment.

The sequences shown in FIGS. 3 and 4 may be implemented in software, firmware and/or hardware. In software and firmware embodiments, the sequence may be implemented by computer executed instructions stored in one or more non-transitory computer readable media such as magnetic, optical or semiconductor storage.

If $N_{bs}$ was exceeded, in a sliding window pass over the image, referring to sequence 30 in FIG. 3, first analyze the candidate window of size $W_0 \times H_0$ at the location (0, 0) as shown in block 32.

Each location of the window, covering a part of the image, represents a candidate region, which may or may not contain the object of interest. Whether the window covers an object of interest is determined by a classifier applied to this region. If the candidate passes at diamond 34, the region is added to the list of found objects (block 36).

Otherwise, move the window to the right by $d_x$ (where $d_x$ is a user-specified parameter) (block 38). If the rectangle no longer stays entirely within the image (diamond 40), then move the rectangle down to (0, $d_y$) ($d_y$ is another user specified parameter) (block 42). If the rectangle stays in the image (diamond 44), then iterate back to diamond 34. Otherwise the flow ends.

Two classifiers are applied as indicated by sequence 50 in FIG. 4 First, check whether the region has rich enough texture (diamond 52) by deciding whether the standard deviation of pixel values within the region exceed a certain threshold. The threshold may be computed using all the "positive" trained samples provided by the user. If the standard deviation is less than the threshold, the image region is "too uniform" and the flow skips to the next region (block 54).

Otherwise, apply a boosted chain classifier (block 56). This classifier is a sum of responses from weak classifiers it consists of, and the sum is computed iteratively. Each weak classifier is applied one by one. Each weak classifier may be primitive 1-node decision tree that gives a numerical response for the current window, which is added to the iterative sum (block 58). After adding responses from all the weak classifiers from the stage, compare the intermediate sum to the threshold $T_{stage}$ computed during training (block 60).

If the sum is less than the threshold $T_{stage}$ (diamond 62), end the classification procedure with the verdict "this window does not represent an object of interest" (block 66). Otherwise, move to the next stage (block 64) and iterate back to block 56.

Figure 5:
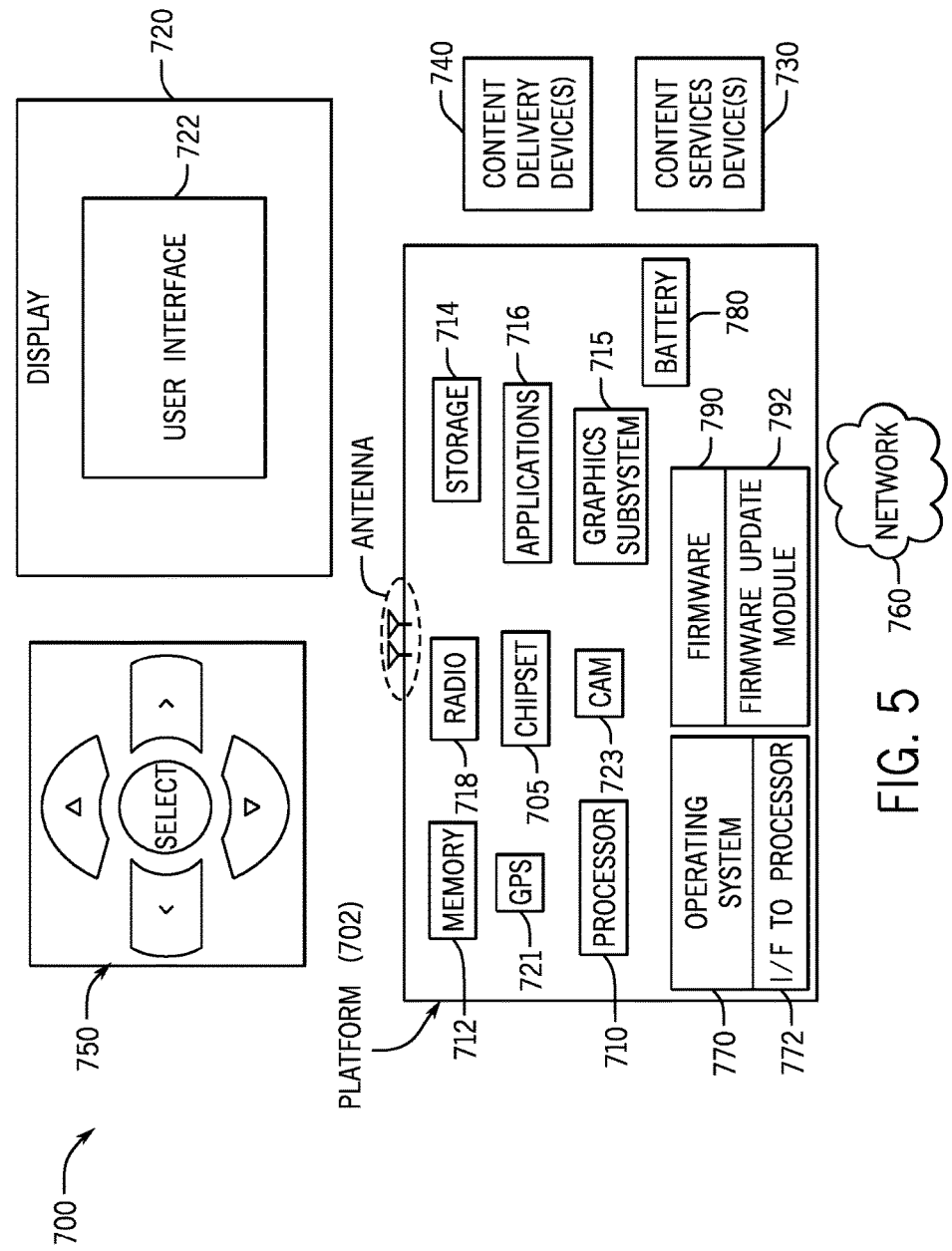
FIG. 5 is a system depiction for one embodiment.

FIG. 5 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 3 and 4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
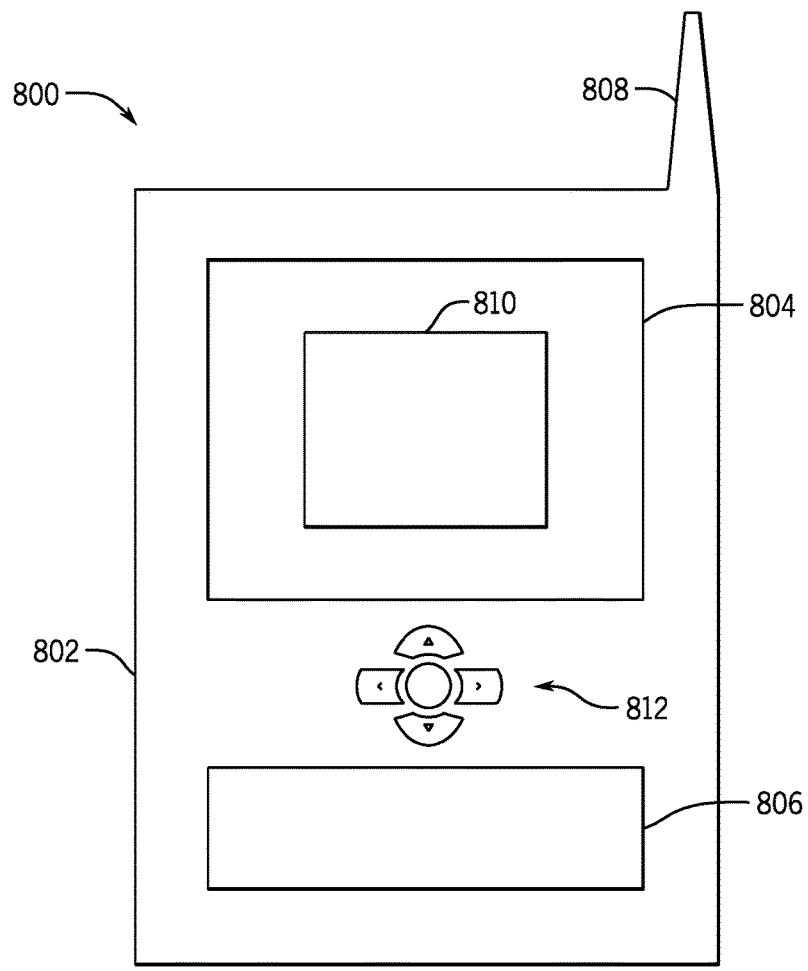
FIG. 6 is front elevation of a system according to one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 6, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method of detecting objects in an image comprising applying a sliding search window technique onto the image to detect the presence of an object of a predetermined size within a defined area of the image, applying, in the defined area where the sliding search window technique detects an object, a modified boosted tree classifier to determine whether the defined area contains an object or not; wherein the boosted tree classifier comprises a first group of boosted chains to detect an object based on a plurality of groups of weak classifiers, if an object is detected, apply a second group of boosted chains based on a plurality of groups of strong classifiers, and if an object is still detected, provide an output listing an object candidate and its position and size in the defined area of the image. The method may also include selecting an object from the group consisting of a face, a pedestrian, and a street sign. The method may also include wherein, after applying a sliding search window technique onto the image, further comprising detecting objects larger than the predetermined size within the defined area of the image, scaling down the image, and applying the sliding search window technique on the scaled-down image. The method may include using a boosted tree classifier at each scale and each position of a sliding window. The method may include calculating the boosted tree classifiers as boosted chains. The method may include exiting before applying the second group of classifiers if the object is determined to be not present based on a magnitude of a sum of weak classifiers. The method may include using faster features for said first group and slower features for said second group. The method may include detecting larger objects by scaling down the image. The method may include wherein said modified boosted tree classifier operates on a blurred image. The method may include wherein said second group of chains operates on an unblurred image.

In another example embodiment may be one or more non-transitory computer media storing computer instructions executable for performing a sequence comprising applying a sliding search window technique onto the image to detect the presence of an object of a predetermined size within a defined area of the image, applying, in the defined area where the sliding search window technique detects an object, a modified boosted tree classifier to determine whether the defined area contains an object or not; wherein the boosted tree classifier comprises a first group of boosted chains to detect an object based on a plurality of groups of weak classifiers, if an object is detected, apply a second group of boosted chains based on a plurality of groups of strong classifiers, and if an object is still detected, provide an output listing an object candidate and its position and size in the defined area of the image. The media may further store instructions to perform a sequence including selecting an object from the group consisting of a face, a pedestrian, and a street sign. The media may further store instructions to perform a sequence including wherein, after applying a sliding search window technique onto the image detecting objects larger than the predetermined size within the defined area of the image, scaling down the image, and applying the sliding search window technique on the scaled-downed image. The media may further store instructions to perform a sequence including using a boosted tree classifier at each scale and each position of a sliding window. The media may further store instructions to perform a sequence including calculating the boosted tree classifiers as boosted chains. The media may further store instructions to perform a sequence including exiting before applying the second group of classifiers if the object is determined to be not present based on a magnitude of a sum of weak classifiers. The media may further store instructions to perform a sequence including using faster features for said first group and slower features for said second group. The media may further store instructions to perform a sequence including detecting larger objects by scaling down the image. The media may further store instructions to perform a sequence wherein said modified boosted tree classifier operates on a blurred image. The media may further store instructions to perform a sequence wherein said second group of chains operates on an unblurred image.

Another example embodiment may be an apparatus comprising a processor to apply a sliding search window technique onto the image to detect the presence of an object of a predetermined size within a defined area of the image, apply, in the defined area where the sliding search window technique detects an object, a modified boosted tree classifier to determine whether the defined area contains an object or not; wherein the boosted tree classifier comprises a first group of boosted chains to detect an object based on a plurality of groups of weak classifiers, if an object is detected, apply a second group of boosted chains based on a plurality of groups of strong classifiers, and if an object is still detected, provide an output listing an object candidate and its position and size in the defined area of the image, and a storage coupled to said processor. The apparatus may include said processor to select an object from the group consisting of a face, a pedestrian, and a street sign. The apparatus may include wherein, after applying a sliding search window technique onto the image, said processor to detect objects larger than the predetermined size within the defined area of the image, scale down the image, and apply the sliding search window technique on the scaled-downed image. The apparatus may include said processor to use a boosted tree classifier at each scale and each position of a sliding window. The apparatus may include said processor to calculate the boosted tree classifiers as boosted chains. The apparatus may include said processor to exit before applying the second group of classifiers if the object is determined to be not present based on a magnitude of a sum of weak classifiers. The apparatus may include said processor to use faster features for said first group and slower features for said second group. The apparatus may include said processor to detect larger objects by scaling down the image. The apparatus may include a battery and firmware and a module to update said firmware.

The processing techniques described herein may be implemented in various hardware architectures. For example, techniques may be integrated within a chipset. Alternatively, a discrete processor may be used. As still another embodiment, the techniques may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method of detecting objects in an image comprising:
   applying in a processor a sliding search window technique onto the image to detect the presence of an object of a predetermined size within a defined area of the image;
   applying, in the defined area where the sliding search window technique to detect an object, classifiers to determine whether the defined area contains an object or not, wherein applying the classifiers comprises applying first chains on a first set of image features to detect an object based on weak classifiers and when no object is detected, applying second chains to a second set of image features, where the second set is more computationally complex than said first set;
   only when an object is detected, applying a third group of chains using said processor based on a group of strong classifiers, wherein said strong classifiers are more computationally expensive for said processor than said weak classifiers and said weak and strong classifiers being different classifiers; and
   when an object is still detected after applying said third group of chains, providing an output listing an object candidate and its position and size in the defined area of the image.

2. The method of claim 1 including selecting an object from the group consisting of a face, a pedestrian, and a street sign.

3. The method of claim 1 wherein, after applying a sliding search window technique onto the image, further comprising:
   detecting objects larger than the predetermined size within the defined area of the image;
   scaling down the image; and
   applying the sliding search window technique on the scaled-downed image.

4. The method of claim 3 including using a boosted tree classifier at each scale and each position of a sliding window.

5. The method of claim 4 including calculating the boosted tree classifiers as boosted chains.

6. The method of claim 1 including exiting before applying the second group of classifiers if the object is determined to be not present based on a magnitude of a sum of weak classifiers.

7. The method of claim 1 including using faster features for said first group and slower features for said second group.

8. The method of claim 1 including detecting larger objects by scaling down the image.

9. The method of claim 1 wherein said modified boosted tree classifier operates on a blurred image.

10. The method of claim 1 wherein said second group of chains operates on an unblurred image.

11. One or more non-transitory computer media storing computer instructions executable for performing a sequence comprising:
  applying in a processor a sliding search window technique to onto the image to detect the presence of an object of a predetermined size within a defined area of the image;
  applying, in the defined area where the sliding search window technique to detect an object, classifiers to determine whether the defined area contains an object or not, wherein applying the classifiers comprises applying first chains on a first set of image features to detect an object based on weak classifiers and when no object is detected, applying second chains to a second set of image features, where the second set is more computationally complex than said first set;
  only when an object is detected, applying a third group of chains using said processor based on a group of strong classifiers, wherein said strong classifiers are more computationally expensive for said processor than said weak classifiers and said weak and strong classifiers being different classifiers; and
  when an object is still detected after applying said third group of chains, providing an output listing an object candidate and its position and size in the defined area of the image.

12. The media of claim 11, further storing instructions to perform a sequence including selecting an object from the group consisting of a face, a pedestrian, and a street sign.

13. The media of claim 11, further storing instructions to perform a sequence including wherein, after applying a sliding search window technique onto the image:
  detecting objects larger than the predetermined size within the defined area of the image;
  scaling down the image; and
  applying the sliding search window technique on the scaled-downed image.

14. The media of claim 13, further storing instructions to perform a sequence including using a boosted tree classifier at each scale and each position of a sliding window.

15. The media of claim 14, further storing instructions to perform a sequence including calculating the boosted tree classifiers as boosted chains.

16. The media of claim 11, further storing instructions to perform a sequence including exiting before applying the second group of classifiers if the object is determined to be not present based on a magnitude of a sum of weak classifiers.

17. The media of claim 11, further storing instructions to perform a sequence including using faster features for said first group and slower features for said second group.

18. The media of claim 11, further storing instructions to perform a sequence including detecting larger objects by scaling down the image.

19. The media of claim 11, further storing instructions to perform a sequence wherein said modified boosted tree classifier operates on a blurred image.

20. The media of claim 11, further storing instructions to perform a sequence wherein said second group of chains operates on an unblurred image.

21. An apparatus comprising:
  a processor to apply a sliding search window technique onto the image to detect the presence of an object of a predetermined size within a defined area of the image, apply, in the defined area where the sliding search window technique to detect an object, classifiers to determine whether the defined area contains an object or not, wherein applying the classifiers comprises applying first chains on a first set of image features to detect an object based on weak classifiers and when no object is detected, applying second chains to a second set of image features, where the second set is more computationally complex than said first set, only when an object is detected, apply a third group of chains based on a group of strong classifiers, wherein said strong classifiers are more computationally expensive for said processor than said weak classifiers and said weak and strong classifiers being different classifiers, and when an object is still detected after applying said third group of chains, provide an output listing an object candidate and its position and size in the defined area of the image; and
  a storage coupled to said processor.

22. The apparatus of claim 21, said processor to select an object from the group consisting of a face, a pedestrian, and a street sign.

23. The apparatus of claim 21, wherein, after applying a sliding search window technique onto the image, said processor to detect objects larger than the predetermined size within the defined area of the image, scale down the image, and apply the sliding search window technique on the scaled-downed image.

24. The apparatus of claim 23, said processor to use a boosted tree classifier at each scale and each position of a sliding window.

25. The apparatus of claim 24, said processor to calculate the boosted tree classifiers as boosted chains.

26. The apparatus of claim 21, said processor to exit before applying the second group of classifiers if the object is determined to be not present based on a magnitude of a sum of weak classifiers.

27. The apparatus of claim 21, said processor to use faster features for said first group and slower features for said second group.

28. The apparatus of claim 21, said processor to detect larger objects by scaling down the image.

29. The apparatus of claim 21 including a battery.

30. The apparatus of claim 21 including firmware and a module to update said firmware.

* * * * *